United States Patent [19]

Collins

[11] Patent Number: 5,367,988
[45] Date of Patent: Nov. 29, 1994

[54] DYNAMIC AIR CLEANER AND CARBURETOR PRESSURIZATION SYSTEM FOR AIR COOLED INTERNAL COMBUSTION ENGINES

[75] Inventor: Imack L. Collins, Shreveport, La.

[73] Assignee: WCI-Outdoor Products, Inc., Cleveland, Ohio

[21] Appl. No.: 114,757

[22] Filed: Sep. 1, 1993

[51] Int. Cl.⁵ ............................................. F01P 1/02
[52] U.S. Cl. ..................... 123/41.65; 123/198 E; 55/438; 55/DIG. 14; 55/DIG. 28
[58] Field of Search ............... 123/41.56, 41.65, 41.7, 123/198 E, 41.63; 55/437, 438, DIG. 14, DIG. 28

[56] References Cited

U.S. PATENT DOCUMENTS

| Re. 23,146 | 9/1949 | Packwood | 123/41.65 |
|---|---|---|---|
| 1,712,091 | 5/1929 | Pence . | |
| 2,585,083 | 2/1952 | Bouvy | 123/41.65 |
| 2,687,782 | 8/1954 | Sonderigger | 183/67 |
| 3,183,899 | 5/1965 | Tuggle | 123/41.65 |
| 3,252,449 | 5/1966 | Couchman, Jr. et al. | 123/41.65 |
| 3,426,513 | 2/1969 | Bauer | 55/459 |
| 3,581,717 | 6/1971 | Fullerton | 123/41.67 |
| 3,994,067 | 11/1976 | Hazzard et al. | 123/41.65 |
| 4,233,043 | 11/1980 | Catterson | 55/315 |
| 4,276,067 | 6/1981 | Lindman | 55/337 |
| 4,381,930 | 5/1983 | Hansen | 55/339 |
| 4,716,860 | 1/1988 | Henriksson et al. | 123/41.05 |
| 4,791,860 | 12/1988 | Verheijen | 99/323.3 |
| 4,838,908 | 6/1989 | Bader et al. | 55/385 |
| 4,841,920 | 6/1989 | Andreasson et al. | 123/41.66 |
| 5,231,956 | 8/1993 | Lux et al. | 123/41.65 |
| 5,269,265 | 12/1993 | Pretzsch et al. | 123/41.65 |

FOREIGN PATENT DOCUMENTS

564932 10/1944 United Kingdom ......... 55/DIG. 14

*Primary Examiner*—Noah P. Kamen
*Attorney, Agent, or Firm*—Pearne, Gordon, McCoy & Granger

[57] ABSTRACT

An air cooled internal combustion engine for a handheld power tool has a flywheel fan that is rotated within a fan housing. The bottom of the fan housing, which is perpendicular to the axis of rotation of the fan, includes an opening for an air duct. Ramps are formed around the leading edges of the duct opening, either on a plate (metal or plastic) attached to the housing or integrally with the bottom wall, for deflecting solid particles entrained in the air away from the outlet. A relatively particle-free stream of pressurized air stream is diverted into the duct and delivered to an air intake box containing an air filter and carburetor.

18 Claims, 2 Drawing Sheets

DYNAMIC AIR CLEANER AND CARBURETOR PRESSURIZATION SYSTEM FOR AIR COOLED INTERNAL COMBUSTION ENGINES

TECHNICAL FIELD OF THE INVENTION

The invention is concerned with an apparatus and method for removing solid airborne contaminants from combustion air supplied to a carburetor of an air cooled internal combustion engine that powers a portable work producing apparatus such as a chain saw.

BACKGROUND OF THE INVENTION

Engines used to power lawn, garden, and forestry equipment, such as chain saws, are often used in environments in which there is a large concentration of sawdust, dirt, and particulate contaminants. Without an air filter, dirt, dust, and other solid airborne contaminants drawn into the carburetor can become embedded in the oil film between the moving engine parts, thus creating an abrasive media that promotes engine failure. In environments having high concentrations of airborne contaminants, air filters clog more rapidly, thus obstructing air flow and decreasing engine performance unless changed frequently. Where dust and dirt are excessive, larger filters are used to extend intervals between filter replacement. However, size and space on portable, hand-held equipment is at a premium, and thus larger filters are somewhat undesirable and impractical. To enable the use of smaller filters, without reducing maintenance intervals to replace filters, the carburetor and/or air filter of the engine are enclosed in a box that is pressurized with clean air to keep dirt and other contaminants away from the carburetor and its air filter. If the engine is fuel injected and has no carburetor, the pressurized box containing the filter is coupled to the intake port of the cylinder. The slight pressurization of the box also helps to improve performance of the internal combustion engine by delivering pressurized air to the carburetor so that the gas mixture load can be increased.

Two-stroke engines used on portable hand-held power equipment are air-cooled using air blown by a flywheel fan connected to the engine's crankshaft. Because weight, size and cost are critical constraints on design of engines for hand-held power tools, the relatively high velocity cooling air blown by the fan is a desirable source for air to pressurize the carburetor or filter box. Unfortunately, air drawn into the fan is itself often contaminated with a considerable amount of dust or debris.

Two patents, U.S. Pat. No. 4,851,920 to Andreasson, et al. and U.S. Pat. No. 4,716,860 to Henriksson, et al., are examples of one approach to diverting a relatively contaminant-free portion of a high velocity air stream from an impeller or fan to a carburetor. A plate along a portion of the periphery of a rotating impeller and parallel to the impeller axis of rotation shields an inlet, located immediately behind the plate, to a duct leading to a carburetor inlet port. The impeller imparts to particulate contaminants a centrifugal force that carries the contaminants radially away from the impeller. Due to the relatively higher inertia of the particles as compared to the air, the centrifugal forces carry the particles radially outwardly. Heavier particles, due to their inertia, do not easily bend around the plate and into the inlet. A stream of relatively high velocity air, relatively free of larger particles, is, however, capable of turning into the inlet and is, thus, diverted into the inlet. The inlet is connected by a tube or duct to the carburetor inlet port. The particulate contaminants are carried away by the remainder of the air stream. A Jonsered Model 2051 chain saw improves on the Andreasson et al. design by placing a small ramp or "bump" at the leading edge of the plate, near the rotating fan blades. The bump on the leading edge of the duct inlet produces a lift which assists in deflecting airborne particulate contaminants away from the inlet.

There are problems with this design. The carburetor inlet duct in the flywheel fan housing interferes with the flow of cooling air out of the fan housing or volute. This interference reduces cooling of the engines. Under heavy loads and in the hot environment in which forestry, lawn and garden equipment sometime operate, the interference leads to engine overheating and failure. Due to its position, mounting of this design tends to be less than stable. Furthermore, the design is complicated and expensive to manufacture and assemble. It requires several additional components that must be manufactured to close tolerances and precisely aligned during assembly for satisfactory performance.

U.S. Pat. No. 4,233,043 to Carterson also relies on the relatively high inertia of the particulate matter to supply clean air to a carburetor duct. A duct projects into the side of a flywheel fan housing. The inlet to the duct is angled with respect to the flow of air so that the air being blown past the duct must undergo an abrupt change in direction in order to enter the duct. Particulate contaminants entrained in the air stream tend to be carried past the duct inlet due to their relatively high velocity. However, the Catterson et al. design is not able to provide a relatively high-velocity air stream for pressurizing a carburetor.

SUMMARY OF THE INVENTION

The invention provides an apparatus and method that separates particles from a portion of an air stream in a blower without many of the disadvantages of the prior art.

According to the invention, an inlet for a duct through which an air stream is delivered to a carburetor is formed in a bottom wall of a fan volute or housing, as opposed to adjacent the fan or impeller, the outlet of the volute. The bottom wall of the volute is perpendicular to the axis of rotation of a centrifugal impeller mounted within the volute and driven by an internal combustion engine that is cooled by the air blown by the fan. A ramp around a leading edge of the duct inlet, in the direction from which the air stream is flowing, lifts or redirects the momentum of particles entrained in a stream of air, particularly the heavier ones away from duct inlet. The momentum of the redirected particles assists in carrying them over the inlet. A portion of the air stream that is relatively particle-free therefore flows into and through the air duct to the carburetor.

No shield adjacent the impeller is required and no portion of the duct or tube is located within the fan volute to obstruct the flow of cooling air blown by the fan across the engine. Cooling of the engine is thus improved. The present invention lends itself to simpler installation and fewer parts than the prior art. Installation and alignment of a shield adjacent the impeller and an inlet to the air duct behind the shield is not necessary. Cost of assembly is reduced. Fewer and less complex pans result in less expensive manufacture.

According to other inventive aspects of the apparatus and method subsequently described, a plate having a ramp formed around an opening is secured to the housing, over the duct inlet, or the fan volute is formed with a ramp around the opening. Reliability of performance is improved, as alignment of the ramp will be much less effected by vibration associated with operation of the engine. Furthermore, means for assuring properly alignment of the plate with the opening in the fan volute is provided to assure proper initial alignment during assembly.

Other features and advantages will become apparent to those skilled in the art upon review of the following Detailed Description of the Preferred Embodiment of the Invention, claims and Drawings.

DETAILED DESCRIPTION OF THE PREFERRED EMBODIMENTS

Figure 1:
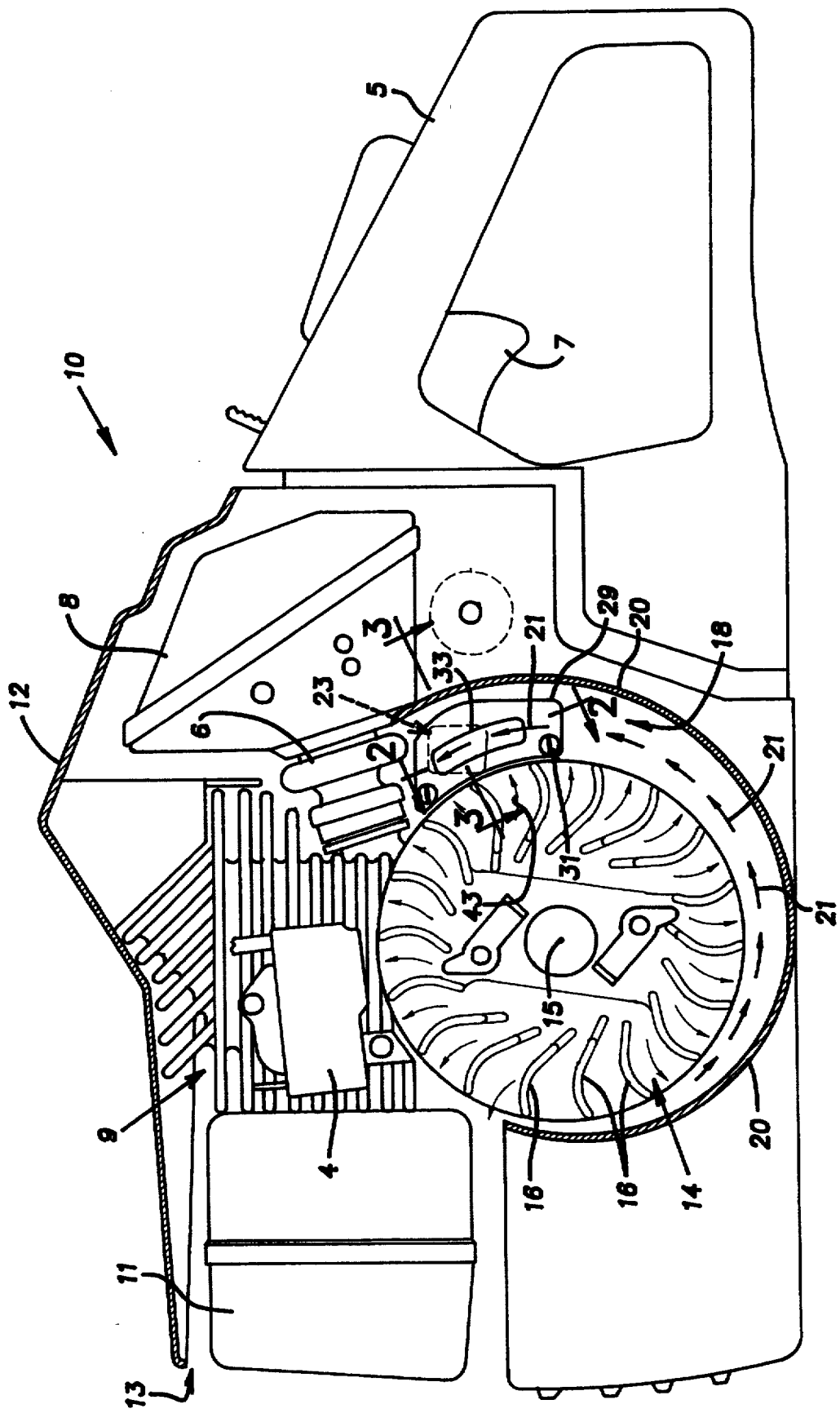
FIG. 1 is a side elevational view, partially in cross section, of a power chain saw.

The preferred embodiments of the present invention and its advantages are best understood by referring to the drawings, like numerals being used for like and corresponding parts of the various drawings.

In FIG. 1, there is shown a power chain saw, generally designated 10, that is somewhat schematically illustrated. The chain saw is intended to be representative of hand-held power tools that utilize small displacement air-cooled engines for power. It has a housing 12, the left-side portion of which has been removed to reveal portions of a single-cylinder engine that is crankcase aspirated, two-stroke and air-cooled. The engine drives a flywheel fan or impeller 14 for blowing cooling air toward a cylinder 9, past a muffler 11 and then out through an opening 13 in the front of saw housing 12. A carburetor (not visible) mounted within carburetor box 8 supplies a fuel air mixture to the crankcase of the engine through a flexible conduit 6. Pressurizing the carburetor box 8 forces air through gaps (not shown) in the box and around orifices for choke and throttle controls and thus prevents dirt and other matter from entering the carburetor box 8 through such gaps. In the case of a fuel injected engine, the pressurized box provides clean air to the cylinder intake. It should be noted that the flexible conduit 6 is necessary only if the engine is to be isolated from the remainder of the components, including the carburetor, for purpose of vibration control. However, if the engine and carburetor are isolated together, the connection between the carburetor and the engine need not be flexible. In the later case, the air box ducting can be molded in the housing to eliminate extra parts. The saw 10 is held by a rear handle 5 that is integrally formed with housing 12 and includes a trigger switch 7 for controlling the engine throttle. The saw 10 also has a front handle that is not shown.

Disposed within the engine's cylinder 9 is a piston (not shown) that rotates a double balanced crankshaft (which cannot be seen) in a conventional manner. An ignition module 4 generates a spark to supply to a spark plug (not shown) when a magnet embedded in flywheel fan 14 passes by the module. The crankshaft has two ends and is mounted within a crankcase transverse to the housing. On the side opposite the one shown, a sprocket is mounted on one end of the crankshaft. A chain guide (not shown) is attached in a conventional manner to the saw 10 and a cutting chain, also not shown, is placed on the guide in a conventional manner and driven by the sprocket.

The flywheel fan 14 is connected to the other end of the crankshaft for rotation about axis 15 during operation of the engine. The fan 14 is a radial flow centrifugal impeller having a plurality of blades or vanes 16 disposed around its periphery.

Figure 3:
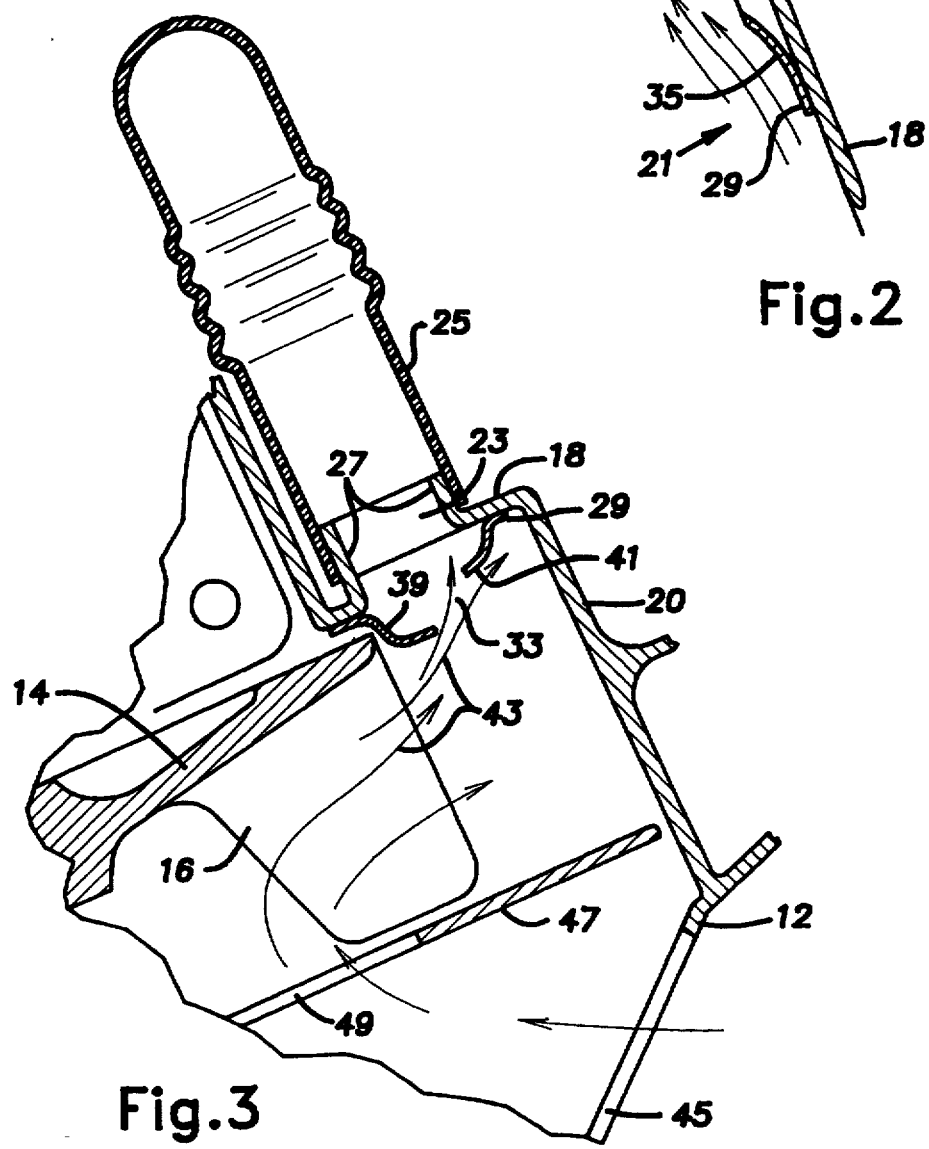
FIG. 3 is an enlarged, fragmentary, cross-sectional view taken along the line 3—3 in FIG. 1.

Referring briefly to FIG. 3, air from outside the housing 12 is taken in through vents or openings 45 in the removed saw housing over the fan or impeller 14 and blown by impeller radially outwardly from the axis 15. Vents or openings 45 are kept relatively small to prevent large objects from falling into the fan 14. A top baffle 47 to a fan housing above the impeller blades 16 includes a hole 49 coaxial with the impeller 14 through which air flows into the center of the impeller. The top baffle 47 is placed in close proximity to the top of the blades 16 to prevent appreciable recirculation of air from the high pressure side to the low pressure side of the impeller, between the top of the blades 16 and the top of the fan housing.

Referring back to FIG. 1, the fan housing includes a curved side wall 20. Sidewall 20 extends along a portion of the periphery of the fan housing and has a height approximate to that of fan blades 16. The side wall 20 forms, in combination with a top (removed) and bottom wall 18 of the fan housing, a scroll-shaped fan volute that redirects and consolidates air flowing radially outwardly from axis 15 and away from cylinder 9 into an air stream flowing along the circumference of the impeller 14, as generally indicated by arrows 21. This air stream exits the fan housing, near the end of side wall 20, toward cylinder 9. Bottom wall 18 of the fan housing is generally perpendicular to the axis of rotation 15 of the fan.

Figure 2:
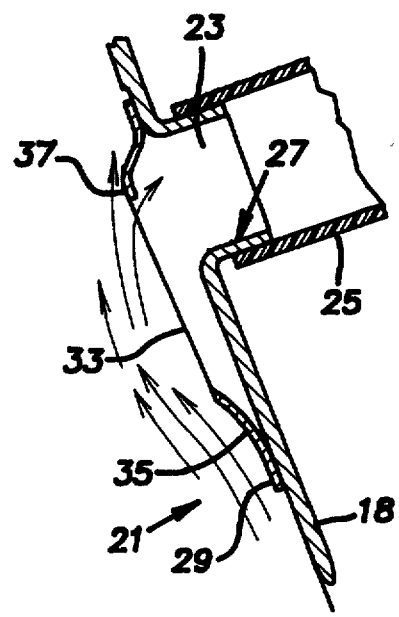
FIG. 2 is an enlarged, fragmentary, cross-sectional view taken along the line 2—2 in FIG. 1.

Referring now to FIGS. 1, 2 and 3, defined within the bottom wall 18 of the fan housing is an orifice 23 that forms an inlet to a flexible air duct or tube 25. The tube 25 may be rigid and, to reduce the number of parts, molded as an integral unit with the bottom wall 18 and possibly also with the carburetor box 8. Air duct 25 is coupled to carburetor box 8 for supplying a stream of air with which to pressurize the carburetor box. Integrally formed on the backside of bottom wall 18, around the orifice 23 is a collar 27 over which the duct 25 tightly fits to facilitate assembly.

A plate 29 is attached to the bottom wall 18 over the orifice 23 using conventional fasteners, such as screws 31. The plate 29 is punched to form an orifice or opening 33 that is elongated and curved generally in the direction of the predominant air stream travelling through the fan volute, as indicated by arrows 21. The plate 29 is also stamped to form a leading front edge ramp 35, a rear edge air scoop 37, a leading side edge ramp 39 and a rear side edge air scoop 41. The leading front edge ramp 35 (FIG. 2) deflects particles entrained in the air stream designated by arrows 21 generally outwardly away from the plate opening 33, as shown in FIG. 2. A portion of the air stream, behaving like a typical fluid, tends to bend into the plate opening 33 and then into the duct inlet opening 23. The plate orifice 33 is elongated and the duct inlet orifice 23 is located toward the rear of the plate opening. This arrangement allows for a sufficient change in direction of the air stream so that it more smoothly enters the duct inlet orifice 23 and preserves as much of the velocity of the air stream as possible. The rear edge air scoop 37 further assists in redirecting downward the air stream while tending to prevent particles and other debris from falling into the duct inlet orifice 23 from the rear of the plate 29. The trajectories followed by deflected particles will vary depending on their mass. The larger, heavier particles will experience greater deflection than the smaller, lighter weight particles due to their greater mass. The momentum of most of the particles entrained in the air stream are, thus, high enough to carry them over the plate opening 33 without being carried inwardly by the air stream. The portion of the air stream diverted into the duct inlet orifice 23 is consequently relatively free of particles, especially larger and heavier ones.

Locating the duct inlet orifice 23 radially inwardly from the side wall 20 also reduces the possibility of larger particles entering the orifice (FIG. 1). The larger particles, due to their inertia, tend to travel along or adjacent the inside surface of the side wall 20.

Referring only to FIGS. 1 and 3, a portion of the radial flow of stream from the fan or impeller 14 that is adjacent and transverse to the plate, represented by arrows 43, will blow transversely across the plate opening 33. The leading side edge ramp 39 of the plate 29 thus blocks or deflects particles entrained in transverse air flow 43 across the plate opening 33. Because the velocity of the transverse air flow 43 is less than the velocity of the predominant air stream 21 across the length of the opening 33, the transverse dimension of the plate opening 33 is made considerably shorter than its length, as shown best in FIG. 1. To further ensure that air particles entrained in the transverse air stream do not fall into or enter the plate opening 33, rear side edge air scoop 41 is appreciably lower than the leading side edge ramp 39, as shown best in FIG. 3.

Alternately, the plate 29 is a plastic molded part. Further, the leading side edge ramp 39 may be replaced with a wall or other obstruction between the impeller or fan 14 and the leading side edge of the plate 29 to prevent particles entrained in the transverse air flow 43 from entering the plate opening 33. Curving such a wall outwardly away from the impeller, in a manner that follows the side wall 20 of the blower housing, redirects the traverse air stream 43 away from the duct orifice 23. The wall could be integrally formed with the plate 29, such as with a simple bending operation if the plate is made of a metal, and could be less than full height. The wall could be molded with the plate 29 if the plate is a molded plastic part. The wall could also be the beginning of a volute wall of the fan housing. In effect, the orifice for the duct inlet is mounted in an outlet section for a blower with a full scroll that is intended to provide a single, high velocity air stream through its outlet, rather than the blower with a partial scroll or volute that is used for purposes of illustration.

Figure 4:
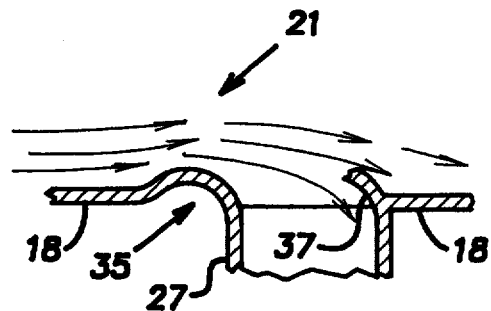
FIG. 4 is an alternate embodiment of the portion of the chain saw shown in the section of FIG. 2.

Referring now to an alternate embodiment illustrated in FIG. 4, in place of the plate 29 shown in FIG. 2, the ramp 35 and scoop 37 may be integrally formed with the bottom wall 18 of the fan housing, such as when the fan housing is molded as an integral piece of plastic. Side ramp 39 and scoop 41, as seen in FIG. 3, would also be molded with the bottom wall 18. If a wall, as discussed above, is used instead of ramp 39, it too would be integrally molded with bottom wall 18 of the fan housing.

The invention and its advantages have been described with reference to a preferred embodiments. Persons skilled in the art will recognize that numerous rearrangements, modifications and substitutions are possible without departing from the spirit and scope of the present invention as defined by the claims appended hereto. The foregoing description is thus not to be construed as limiting the invention to the specific preferred embodiments described.

What is claimed is:

1. A portable work producing apparatus comprising:
   an air-cooled internal combustion engine for producing power to be delivered to a work producing implement;
   a centrifugal fan impeller coupled to the engine for rotation within a centrifugal fan housing, the fan housing directing air blown radially outwardly from the centrifugal impeller into an air stream flowing substantially in one direction around the impeller toward the engine for cooling;
   an orifice defined within a bottom wall of the fan housing over which the air stream passes, the bottom wall being oriented substantially perpendicular to an axis of rotation of the impeller;
   a ramp positioned in front of the orifice and projecting upwardly into the air stream prior to the orifice without substantially interfering with the air stream in order to deflect particles entrained in the air stream near the bottom wall in a direction away from the orifice while permitting a portion of a lower layer of the air stream to flow over the ramp and to divert downwardly into the orifice, the diverted portion of the air stream being relatively free of particles; and
   a passageway for coupling the orifice to the engine in order to supply the diverted portion of the air stream to the engine for combustion with fuel.

2. The apparatus of claim 1 further comprising a scoop behind the orifice for assisting in diverting a portion of the lower layer of the air stream into the orifice.

3. The apparatus of claim 1 further comprising a second ramp projecting upwardly from the bottom wall of the fan housing between the impeller and the orifice for deflecting particles away from the orifice that are entrained in air flowing radially outwardly from the impeller adjacent the orifice.

4. The apparatus of claim 3 further comprising a scoop associated with a side of the orifice opposite the second ramp for assisting in preventing particles deflected over the orifice from entering the orifice.

5. The apparatus of claim 1 wherein the orifice is spaced a distance from the ramp to permit the portion of the air stream to turn into the orifice and wherein the orifice is dimensioned to provide a predetermined flow rate of air through the orifice.

6. The apparatus of claim 1 further including a box from which air is supplied to the engine for combusting with fuel, said box being coupled to a duct that is pressurized by the flow of air to prevent dirt from entering the box, said duct extending from said orifice to said box.

7. The apparatus of claim 1 wherein the orifice is spaced from a side wall of the fan housing along which heavier particles entrained in the air stream tend to travel.

8. The apparatus of claim 1 wherein the ramp is integrally formed with the bottom wall of the fan housing.

9. A portable work producing apparatus comprising:
an air-cooled internal combustion engine for producing power to be delivered to a work producing implement;
a centrifugal fan impeller coupled to the shaft for rotation therewith and placed within a centrifugal fan housing, the fan housing directing air blown radially outwardly from the centrifugal impeller into an air stream flowing substantially in one direction around the impeller toward the engine for cooling;
an orifice defined within a bottom wall of the fan housing over which the air stream passes, the bottom wall and the orifice being substantially perpendicular to an axis of rotation of the impeller;
a plate attached to the bottom wall over the orifice, the plate including an opening and a ramp positioned along a front edge of the opening that projects upwardly into the air stream prior to the orifice without substantially interfering with the air stream in order to deflect particles entrained in the air stream in a direction away from the orifice while permitting a portion of a layer of the air stream to flow over the ramp and to divert downwardly through the opening and into the orifice, the diverted portion of the air stream being relatively free of particles; and
a duct for coupling the orifice to a carburetor in order to supply the diverted portion of the air stream to the engine for combusting with fuel.

10. The apparatus of claim 9 wherein the plate further includes a second ramp along a side edge of the opening projecting upwardly between the impeller and the orifice for deflecting particles away from the orifice that are entrained in air flowing radially outwardly from the impeller adjacent the orifice.

11. The apparatus of claim 10 wherein the opening in the plate is elongated in the direction of the air stream as compared to the direction of the radial flow of air from the impeller.

12. The apparatus of claim 10 wherein the plate includes a scoop on a side edge of the opening opposite the second ramp to prevent particles from falling into the opening if deflected off a side wall of the housing adjacent the plate.

13. The apparatus of claim 12 wherein a height of the scoop is significantly lower than a height of the ramp to prevent particles from entering the opening.

14. The apparatus of claim 9 wherein the opening in the plate is longer in the direction of the air stream than the orifice, and the orifice is placed near a rear edge of the opening so that the diverted portion of the air stream may enter the orifice while minimizing the area of the orifice.

15. The apparatus of claim 9 wherein the plate further includes a scoop formed on a rear edge of the opening to assist in diverting of the portion of the air stream into the orifice and help to prevent particles from entering the orifice from the rear edge of the opening.

16. The apparatus of claim 9 wherein the opening in the plate is curved and spacedly from a side wall of the fan housing along which heavier particles entrained in the air stream tend to travel.

17. The apparatus of claim 9 wherein the plate is stamped from a sheet of metal and includes means for aligning the plate with the orifice during assembly of the apparatus.

18. The apparatus of claim 9 wherein the orifice is integrally formed in the housing during manufacture of the housing.

* * * * *

UNITED STATES PATENT AND TRADEMARK OFFICE
CERTIFICATE OF CORRECTION

PATENT NO. : 5,367,988

DATED : November 29, 1994

INVENTOR(S) : Imack L. Collins

It is certified that error appears in the above-identified patent and that said Letters Patent is hereby corrected as shown below:

On the title page: Abstract, line 5, delete "axe" and insert --are--;

line 9, after "air" insert --stream--; and line 10, delete "stream" (second occurrence).

Column 2, line 24, delete "Carterson" and insert --Catterson--; and line 68, delete "pans" and insert --parts--.

Column 3, line 15, delete "claims" and insert --Claims--.

Column 8, line 27, (Claim 16, line 2), delete "spacedly" and insert --spaced--.

Signed and Sealed this

Fourteenth Day of March, 1995

Attest:

BRUCE LEHMAN

*Attesting Officer*     *Commissioner of Patents and Trademarks*